United States Patent [19]

Peterson, Jr.

[11] Patent Number: 5,079,962
[45] Date of Patent: Jan. 14, 1992

[54] MATING CORE PROBE VALVE AND RETAINER

[76] Inventor: Charles D. Peterson, Jr., P. O. Box 217, Richardson, Tex. 75080

[21] Appl. No.: 627,700

[22] Filed: Dec. 14, 1990

[51] Int. Cl.⁵ .................................... G01L 7/00
[52] U.S. Cl. ........................................ 73/866.5
[58] Field of Search ............... 73/866.5, 756, 863.81, 73/863.86, 864.21, 864.74, 864.86, 864.87, 863.85; 374/148, 155, 208–210; 137/317, 320, 227, 229; 138/90; 277/27, 70, 167.3, 228

[56] References Cited

U.S. PATENT DOCUMENTS 3,797,317 3/1974 Peterson, Jr. .................... 137/317
4,926,704 5/1990 Survil et al. ..................... 73/866.5

FOREIGN PATENT DOCUMENTS 8317775 12/1983 Fed. Rep. of Germany ..... 73/866.5

Primary Examiner—Robert Raevis
Attorney, Agent, or Firm—Robbins & Robbins

[57] ABSTRACT

A split valve pressure test plug is provided for high pressure fluid systems to sense pressure or temperature by means of a test probe and gauge. The test probe is inserted within split valve resilient valve core members in the test plug. The split valve core members are separable and are interfitted in a male-female relationship to provide for improved sealing upon removal of the test probe. A retainer strap is further provided which retains a cap for the test plug, permits use of a wrench without interference and acts as a sealing ring in addition to a separate gasket when the cap is tightened.

4 Claims, 1 Drawing Sheet

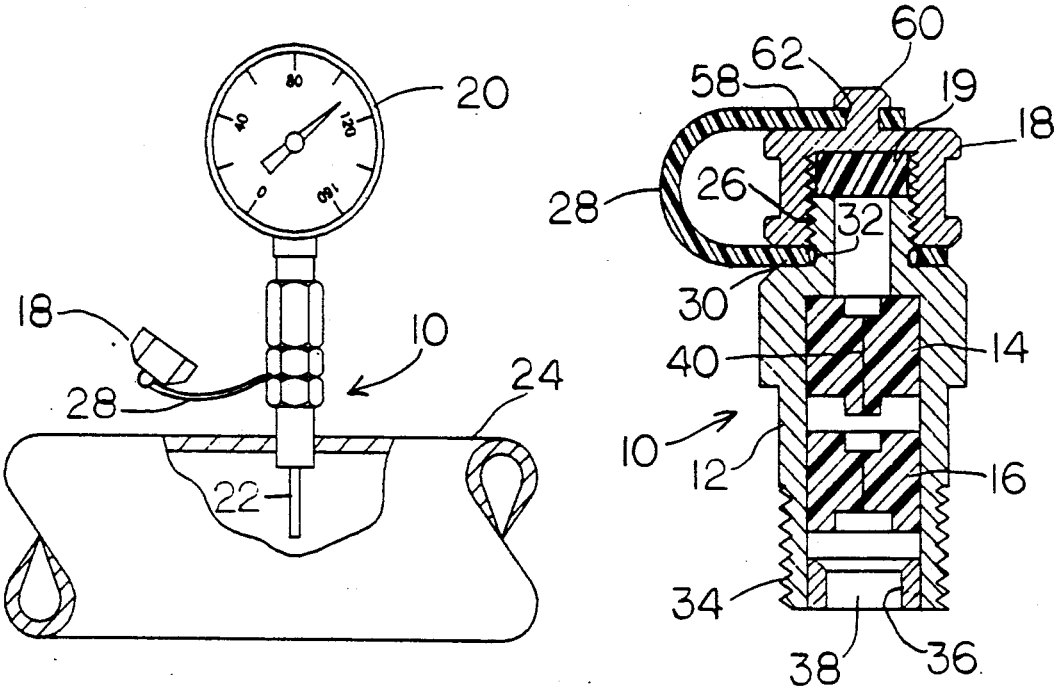
FIG. 1
FIG. 2
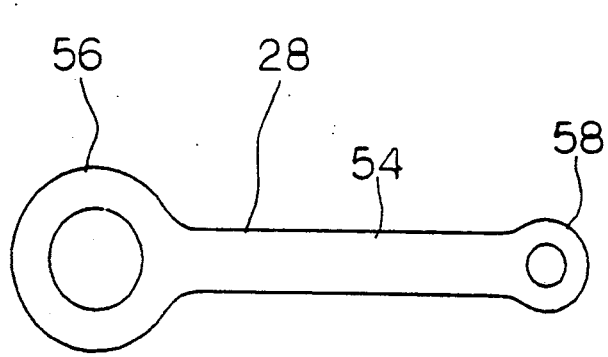
FIG. 3
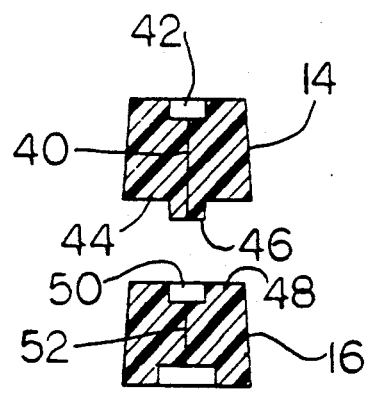
FIG. 4

MATING CORE PROBE VALVE AND RETAINER

BACKGROUND OF THE INVENTION

In the past various types of resilient needle valve and plugs have been provided for receiving a needle valve or probe from a low pressure region to sense a high pressure region such as on a pipe line. The resilient valves in the past have been designed to prevent leakage but it has been a continuous problem to provide a device which is low in cost, simple to use and rugged in construction. Further, there has been a problem in the use of a test probe, such as for temperature sensing through a thermometer, to prevent leakage after the thermometer has been left in the resilient valve core for a period of time due to set of the valve core. On removal, the rubber valve may not return to its original position rapidly and a spurt of hot fluid or sometimes dangerous fluid may escape with obvious hazard to personnel.

In my U.S. Pat. No. 3,797,317, a test plug having separately moveable valve cores is provided. While this test plug has provided a substantial advance in the art and has worked quite efficiently, it remains a problem to provide a fast acting closure of the valves upon removal of the test probe. It has further been a problem and nuisance in the removal of the cap for the test plug to prevent misplacement. Through inadvertence, such caps which are removed when the test probe is removed from the test plug, are quite often lost or misplaced.

SUMMARY OF THE INVENTION

By means of this invention, there has been provided a simple yet rugged pressure or temperature test plug which can be tapped into a high pressure line, tank or the like. The test plug has a valve comprised of two independently moveable resilient valve cores which act rapidly to close against one another upon removal of a test probe. The valves have mating surfaces with male and female portions which rapidly nest and close against one another in the valve seating operation.

The valve cores readily receive a tubular test probe or drain needle or the like to drain off fluid or pump fluid in general use. When not in use, the valve plug can be simply capped to prevent tampering or damage to the plug. A retaining strap is provided which connects the cap to the plug to prevent loss or misplacement of the cap. The retaining strap is designed to permit relative relation of the cap and the plug with respect to the strap and each other in order that a tool such as a wrench or the like may be used without interference by the strap.

The valve core members are similar in construction except that on opposing surfaces one valve core member has a female portion which mates with a male portion of the other valve core member. Both valve core members are of frusto-conical configuration and rapidly and efficiently seat against one another under pressure within the rigid housing of the test plug. Each core is provided with an axial slit through the core and the male or female portion with the sides of the slit being biased toward one another by a compression fit within the housing. The upper valve core member has an insertion guide with a diameter slightly smaller than the test probe to prevent leakage past the probe during insertion. This structure acts like an O-ring to prevent leakage.

Through the use of the two valve cores rapid and efficient sealing is provided upon the removal of the test probe. Upon removal of the probe, the lower valve closes before the upper valve and is compressed against the upper valve as the probe is withdrawn. The male and female interfit of the opposing faces of the two valve cores ensures an efficient seal. The test plug functions extremely well on high pressure systems and also on negative pressure or vacuum systems.

The test plug, by virtue of a threaded portion at the bottom of the housing, can readily be tapped into a pressure line or vessel for measuring internal pressure or temperature of various types of fluids either gas or liquid. No tie-up of equipment is involved since the test probe with pressure gauge or temperature sensing device can be moved from one test plug to another without the requirement of permanent connection.

When a probe is not employed, a protective cap is provided which may be threaded upon a threaded top end of the test plug. A retaining strap of flexible plastic is employed to retain the cap when it is removed. By the use of rings at opposite end of the straps fitting in grooves on the top end of the test plug and a stud on the top of the cap relative movement is permitted. This allows the cap to be freely rotated in connecting it to the top of the test plug. The strap is also designed to permit the use of a wrench or other tool.

The plug and valve construction and retaining strap are simple in construction and manufacture, rugged in use and may be employed without any complex tools or training in installation and use.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWING

FIG. 1 is a view in elevation partly in section of a pressure line equipped with the test plug and valve of this invention receiving a probe and gauge;

FIG. 2 is an enlarged view in axial section showing the test plug and retainer cap;

FIG. 3 is an enlarged plan view showing the retainer strap; and

FIG. 4 is an enlarged view in vertical section showing upper and lower valves with mating male and female faces of the test plug.

DESCRIPTION OF THE INVENTION

The test plug of this invention is generally indicated by the reference numeral 10 in FIGS. 1 and 2. It is comprised of a valve body or housing 12, resilient valve cores 14 and 16 and an internally threaded cap 18 compressible against gasket 19. It is shown in use with a pressure gauge 20 in FIG. 1 connected to a tubular probe 22 adapted to be inserted through the split valve core members 14 and 16 to sense the interior of a pipe line 24.

The valve body 12 as best shown in FIG. 3 is comprised of a rigid metallic housing made of a material such as brass or the like to prevent corrosion. An upper end portion 26 is exteriorly threaded to receive the protective cap 18 having hexagonal sides to proved flats to receive a wrench or the like. A cap retaining strap 28 has an end ring portion 30 which acts as a seal in addition to gasket 19 when the cap is tightened to minimize any possibility of leakage should the valve core be damaged. The upper end portion 26 is bounded by a shoulder 31 with a peripheral groove 32 which receives the retaining strap and provides a sealing relation when the protective cap 18 is tightened in addition to the gasket 19.

The valve housing has an enlarged interior which receives two or more valve cores, two being shown in FIGS. 2 and 4. The bottom portion of the valve housing is exteriorly threaded at 34 to be received in a threaded tapped opening in a wall of a high pressure line to be sensed. Any other type of environment, such as a tank, autoclave or the like may also be used. A retaining member 36 is fitted in the lower end of the valve housing to define a space 38 from the lower valve core 16 a sufficient distance to provide an area for the resilient core members to expand as the probe is passed through the core members and to provide a stop. This area also facilitates the relative movement for the valve cores for the insertion of the probe as well as for its withdrawal.

The two core members are similar in construction except for their mating surfaces. The upper valve core 14 is comprised of a frusto-conical body of resilient material such as neoprene, rubber or the like. It has a longitudinal slit 40 to provide an opening passing through the axis of the valve core to receive the probe 22. The slit starts at cup-shaped top opening 42 to provide for self centering of the probe. The opening has a diameter just slightly less than that of the probe to provide sealing as well as ready insertion. The slit starts at the opening and at the bottom terminates in a mating face 44 having a male member 46 which is adapted to closely nest and seal with a mating face of the lower valve core.

The lower valve core 16 has an upper mating face 48 with a female opening 50 as best shown in FIGS. 2 and 4. It is constructed similarly to the upper valve core 14 and likewise has a slit 52 to receive the probe.

The retaining strap 28 is best shown in FIGS. 2 and 3. It may be constructed of a flexible material such as rubber or plastic with a bight portion 54 connecting a plug ring end 56 and a cap ring end 58. The plug end 56 has a diameter slightly less than the diameter of the threaded portion of the plug end 26 in order that it may be slightly stretched and received in the groove 32 where it is retained. The fit between the ring end 56 and the groove may be loose to provide for relative rotation as desired.

The ring cap end 58 is retained by a stud 60 at the top of the cap. A groove 62 is provided to receive freely for rotation the cap ring end 58 which is stretched over the slightly larger diameter of the stud to fit loosely in the groove.

USE

The pressure plug of this invention is adapted for simple installation and use in a high pressure line or container for fluids such as gases or liquids and in pressure vessels or the like wherever temperatures or pressures or other environments are desired to be sensed from one side of the wall to the other side. Thus the pressure or temperature or any other condition can be sensed from one side of the wall to the other by simple insertion of the tube probe 22 which senses one side of the wall and transmits the sensed condition to the other side by connection either to a pressure gauge, thermometer or any other type of sensing device.

Installation is effected for example in a high pressure pipe line 24 as shown in FIG. 1 by simply tapping an opening 24 in a wall and providing it with threads. The lower threaded end 34 of the valve housing is then simply threaded into the opening and tightened by a wrench around the hexagonal top portion of the valve housing. The wrench easily fits on the test plug around or through the retaining strap. The pressure test plug is then ready for use.

For the installation in FIG. 1 of the pressure gauge 20 the tubular probe 22 is connected to the gauge and simply inserted through the end portion 26 at the top of the housing and into the slits 40 and 52 in the upper valve core member 14 and the lower valve core member 16. The probe is pushed through the two valve members and relative movement of the core members toward the valve retainer 36 is effected which eases and facilitates the movement of the probe through the core members while retaining full sealing. The probe is then passed into the interior of the pipe line or conduit to complete the installation. The pressure gauge 20 will then sense the pressure within the pipe line. After the desired use of the pressure gauge or thermometer, as the case may be or any other sensing device, has been completed the device is then simply removed and the cap 18 is then connected to the top of the test plug until it is desired to be used again.

Upon removal of the probe a special sealing function takes place. In the withdrawal of the probe first the lower valve core member 16 closes before the upper valve 14 to prevent any passage of fluid through the two valve core members. The first closing of the lower valve core member 16 makes the entire unit reseal quite rapidly. The lower valve member tends to compress the upper valve member as the probe is pulled through it which aids and facilitates the sealing as pressure is applied to the upper valve member 14 to compress it. In this sealing action the engagement of the male and female mating surfaces 44 and 48 of the upper and lower valve members ensures and improves the seal. This however, is not completely required as the upper valve 14 will seal on its own but the fast and improved sealing aids in a secure and rapid seal. The entire test plug with the two split valve core members functions quite well on negative pressure and vacuum because of the two phase closing of the valve core members. The two resilient valve core members 14 and 16 provide for simple insertion and removal of the needle probe.

The retaining strap 28 provides for removal and retention of the cap without the danger of misplacement. The plug ring end 56 and cap ring end have a loose fit which permits the removal or subsequent replacement with a wrench or the like without interference. Further, when the cap 18 is replaced and tightened against the ring end 56, a fluid tight seal is provided by the ring end 56 in addition to the gasket 19 for further protection against the loss of fluids.

Various changes and modifications may be made within this invention as will be apparent to those skilled in the art. Such changes and modifications are within the scope and teaching of this invention as defined in the claims appended hereto.

What is claimed is:

1. A pressure test plug comprising a rigid housing having a longitudinal axis adapted to be connected through a wall from a low pressure side to a high pressure side, said housing receiving in radially compressed sealing relation a plurality of resilient valve core members arranged in tandem, each core member having a passage for a tubular probe, said passage comprising a normally closed slit, said slit removably receiving the tubular probe from the low pressure side in sealing relation, characterized in that the core members are axially moveable into and out of engagement with respect to each other and that an adjacent pair of opposed core faces have mating male and female portions engageable in sealing relation with one another to enhance said radially compressed sealing relation when the valve core members are engaged with one another, the slit in said cores passing axially through said male and female portions and removably receiving the tubular probe.

2. The pressure test plug of claim 1 in which said adjacent pair of core faces are adapted to seat and seal against one another, each of said surfaces comprising a flat seating surface and one of said surfaces having said central male portion closely engageable with said central female portion of the other surface and said slit in each core passing axially through said male and female portion.

3. The pressure test plug of claim 1 in which a screw on cap is provided for said housing on a low pressure side, said cap being retained when removed from said housing by a retaining cap strap connected at a cap end to a top of said cap and at an opposite plug end to an outer end of said test plug receiving said cap, said strap being constructed of flexible plastic and being affixed to said cap and said test plug in a manner providing for relative rotation, said outer end being threaded and a peripheral groove being provided therein to receive a retaining ring portion of said strap at said plug end, said peripheral groove being formed adjacent a shoulder of said outer end and said cap being compressible against said outer ring portion to bias it against said shoulder to form a fluid tight seal.

4. The pressure test plug of claim 3 in which a separate gasket is positioned between a top surface of said outer end and an internal surface of said cap and is compressible against both of said surfaces upon tightening of the cap.

* * * * *